United States Patent
Hohnstadt et al.

(10) Patent No.: US 6,374,939 B1
(45) Date of Patent: Apr. 23, 2002

(54) ENGINE MOUNT ASSEMBLY

(75) Inventors: Frederick P. Hohnstadt, Clarkston; Eric N. Jacobson, Wixom; Blaine A. Heavener, South Lyon; John A. Roby, Northville, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/596,930

(22) Filed: Jun. 19, 2000

(51) Int. Cl.$^7$ .................................................. B60K 5/12
(52) U.S. Cl. ........................ 180/299; 180/312; 248/638
(58) Field of Search ............................... 180/291, 292, 180/299, 312; 248/638, 673, 223.41; 403/360, 363; 267/292

(56) References Cited

U.S. PATENT DOCUMENTS

| | | | |
|---|---|---|---|
| 2,305,936 A | | 12/1942 | Tjaarda ........................ 180/54 |
| 3,702,178 A | * | 11/1972 | Schulz ........................ 180/291 |
| 3,705,701 A | * | 12/1972 | Hunt ........................... 180/291 |
| 4,147,318 A | * | 4/1979 | McDonald ................... 180/291 |
| 4,230,382 A | * | 10/1980 | Wenzlick et al. ......... 248/223.41 |
| 4,263,980 A | | 4/1981 | Harlow, Jr. et al. ......... 180/292 |
| 4,834,336 A | * | 5/1989 | Shimazaki et al. .......... 248/638 |
| 5,035,296 A | * | 7/1991 | Sjostrand ..................... 180/292 |
| 5,174,541 A | * | 12/1992 | Hutter et al. ................ 180/312 |
| 5,558,369 A | | 9/1996 | Cornea et al. .............. 280/800 |
| 5,636,826 A | * | 6/1997 | Nakagaki et al. ............ 248/638 |
| 5,718,407 A | * | 2/1998 | Lee ............................. 248/638 |
| 5,791,627 A | * | 8/1998 | Fisch et al. .................. 248/543 |
| 5,845,734 A | | 12/1998 | Samardzich et al. ......... 180/299 |
| 6,053,384 A | * | 4/2000 | Bachman ................ 248/223.41 |
| 6,223,850 B1 | * | 5/2001 | Rajca et al. ................. 180/312 |

FOREIGN PATENT DOCUMENTS

| | | | | |
|---|---|---|---|---|
| FR | 1452199 | * | 8/1966 | ................. 180/312 |
| JP | 4-43172 | * | 2/1992 | ................. 180/312 |
| JP | 6-122325 | * | 5/1994 | ................. 180/312 |

* cited by examiner

*Primary Examiner*—Frank Vanaman
(74) *Attorney, Agent, or Firm*—Laura C. Hargitt

(57) ABSTRACT

An engine mount assembly includes a vehicle frame bracket supporting an engine mounted bracket through an isolator. The frame includes three triangularly positioned tubes extending through a frame rail and defining openings for bolts that secure the frame bracket to the frame. Two longitudinally spaced upper tubes engage V recesses formed by a lip on the frame bracket that guides the bracket into longitudinal alignment with the frame openings during assembly. An inclined ramp on the face of the frame bracket helps position the engine laterally during assembly. Optional flanges on the upper tubes engage slots in the V recesses to prevent lateral movement of the assembly prior to installation of the mounting bolts through the frame tubes. A laterally elongated opening in an isolator support on the frame bracket allows final adjustment of the engine lateral position, if needed.

11 Claims, 2 Drawing Sheets

ENGINE MOUNT ASSEMBLY

TECHNICAL FIELD

This invention relates to engine mounts including bracket and isolator elements attached to an engine for mounting the engine in a vehicle frame. Further, the invention relates to the combination of a vehicle frame or cradle and an engine mount assembly.

BACKGROUND OF THE INVENTION

Many types of engine mounts have been utilized in automotive vehicles to support and cushion an engine within a vehicle frame or cradle. In addition to providing satisfactory support and restraint of the engine, the engine mounts must be designed to provide ease of installation of the engine during assembly of the vehicle.

SUMMARY OF THE INVENTION

The present invention provides an engine mount system or assembly for mounting an engine in a vehicle frame, such as, in a particular embodiment, a truck frame. The mounting assembly simplifies engine decking by providing self-positioning and self-aligning of the engine, permitting control by a single operator. The mount assembly accepts large variations in tolerance stack-ups and holds the engine in position until mounting bolts to the frame are secured. As used in a truck frame, the assembly allows easy bolt access with an air wrench to the outer sides of the frame.

The mount assembly features the addition of three tubular supports or tubes extending through the frame rail and projecting from its inner side. The tubes include through openings for receiving bolts which engage a frame side bracket. The bracket includes an upper lip that forms spaced dual inverted V wedges or recesses which engage and provide alignment of the frame bracket on a spaced upper pair of the tubes. The upper tubes may have flared inner ends that engage slots formed in the V recesses to hold the frame bracket in position prior to bolt installation. An additional lower tube forms a triangular arrangement of tubes within the frame rail. The lower tube protrudes further inside the frame rail than the spaced upper tubes and the frame bracket has an inclined face to laterally center the engine upon assembly while the V recesses of the lip provide longitudinal centering as they engage and rest upon the upper pair of tubes.

The frame bracket is connected to the engine prior to assembly by an isolator and an engine side bracket mounted to the engine. The engine and engine mount assembly are lowered into position together for final assembly to the frame. The frame mounting bolts are then installed through the tubes from the outside of the frame rail and screwed into threaded openings in the frame bracket, fixing the engine in position. If desired, the isolator may be attached between the brackets through a laterally oblong opening that allows alignment of the isolator after the engine is positioned. The tubular supports provide not only mounting protrusions but also help stiffen the frame rail at the point of assembly with the engine.

These and other features and advantages of the invention will be more fully understood from the following description of a specific embodiment of the invention taken together with the accompanying drawings.

DESCRIPTION OF THE PREFERRED EMBODIMENT

Figure 1:
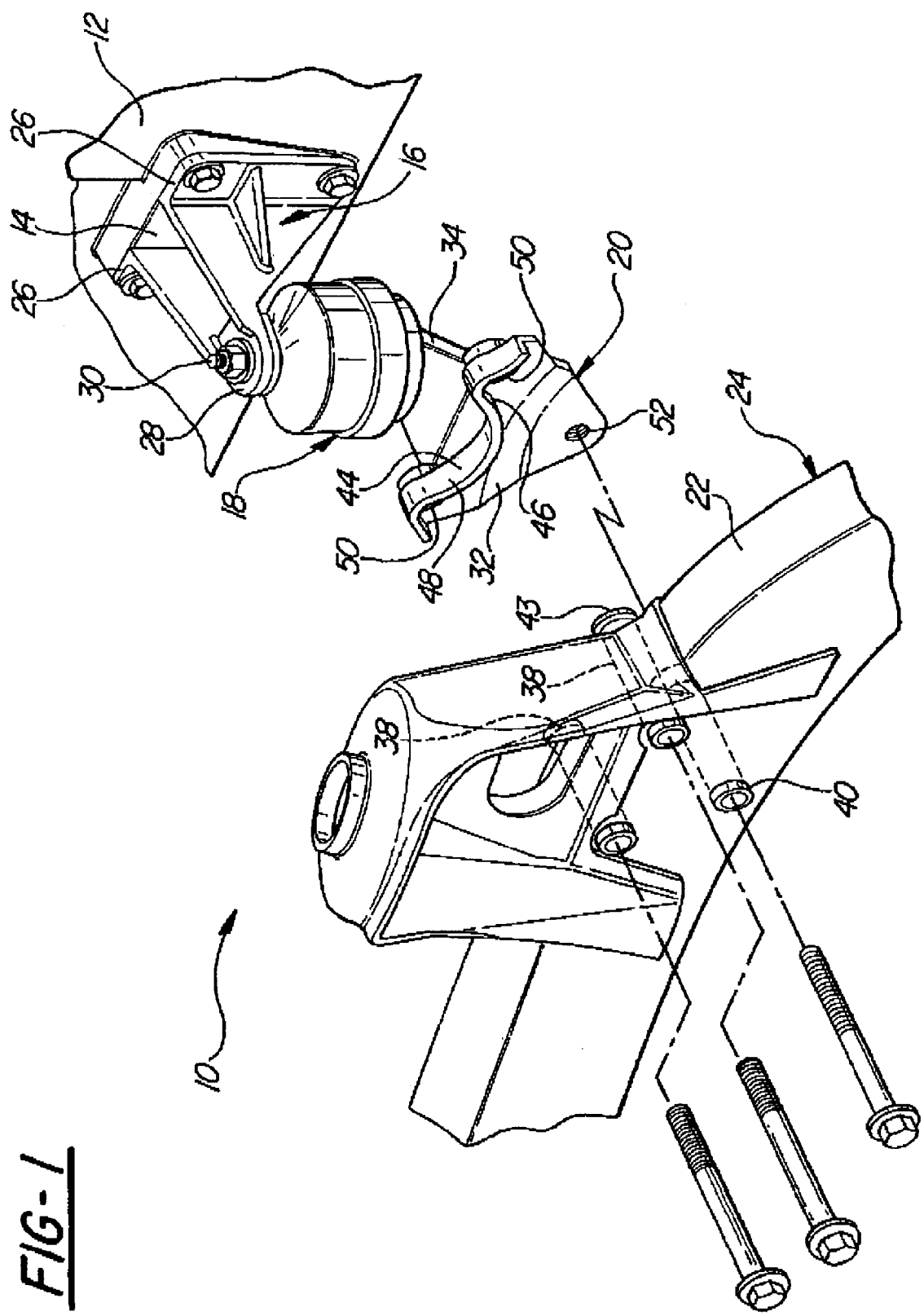
FIG. 1 is an exploded pictorial view illustrating the assembly of an engine and mount assembly on a vehicle frame in accordance with the invention.

Referring first to FIG. 1 of the drawings, numeral 10 generally indicates an engine, mount and frame assembly in an automotive vehicle, such as a truck. Assembly 10 includes an engine 12 having a sidewall mounting pad 14 to which is secured an engine bracket 16 connected with an isolator 18 that is in turn connected to a frame bracket 20. The engine, isolator and brackets together form an engine mount assembly that is connected to a frame rail 22 of an associated vehicle frame 24 in a manner to be subsequently described.

The engine bracket 16 includes one or more mounting flanges 26 that are bolted to the engine mounting pad 14 for supporting the engine. Bracket 16 further includes a laterally extending support 28 having an opening, not shown, receiving an upper stud 30 that is fixed to the support 28 to secure the isolator 18 below the support.

Figure 6:
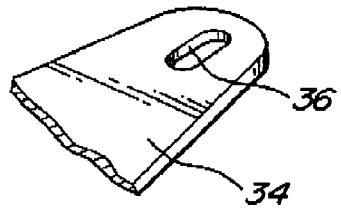
FIG. 6 is a pictorial view showing the slotted opening in the frame bracket support for allowing adjustment of the isolator.

The frame bracket 20 similarly includes a mounting portion 32 that connects with a laterally inwardly extending support 34 having a laterally elongated opening 36 (FIG. 6) which receives and is fixed to a lower stud, not shown, extending downward from the isolator.

For supporting the engine and mount assembly, the frame rail 22 is provided with three mounting tubes extending laterally through the frame rail. These include a pair of longitudinally spaced upper tubes 38 and a downwardly and centrally spaced lower tube 40 arranged in a generally triangular configuration. If desired, additional lower or upper tubes could be utilized.

All three tubes are preferably mounted with their outer ends flush with the side of the frame rail 22. However, the inner ends of the tubes protrude inward from the inner side of the frame rail with the lower tube 40 preferably extending slightly further inward than the upper tubes 38. All three tubes define through openings receiving bolts 42 which extend through the tubes into engagement with the frame bracket 20. The inner ends of the upper tubes 38 preferably include outwardly flared portions or flanges 43.

Figure 4:
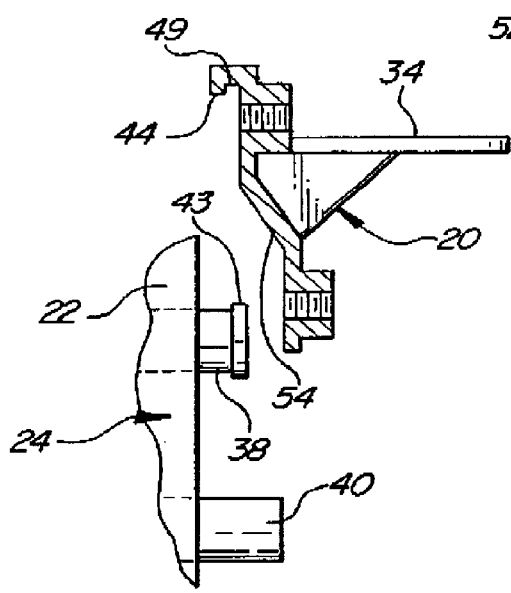
FIG. 4 is a front end view of the bracket and frame showing lateral guidance of the bracket during assembly.

For mounting the engine mount assembly on the frame, the frame bracket 20 is formed with an upper lip 44 that extends laterally outward and defines a pair of longitudinally spaced inverted V recesses 46 connected together by a downwardly bowed portion 48. Slots 49 may be formed at the inner edges of the V recesses to receive the flanges 43 of the upper tubes 38. Dual bolt receiving upper openings 50 are centered within the V recesses 46 and a third lower opening 52 is disposed below and between the upper openings 50. The outer face of the mounting portion 32 is upwardly and outwardly inclined to form a ramp 54 between the lower and upper openings, as is shown in FIG. 4. Openings 50, 52 are formed in bosses and threaded to receive the bolts 42 that are applied from the outside of the frame rail 22. However, it would be possible in an appropriate engine installation where space is available, to provide for installation of the bolts from the inside of the frame bracket 20 for attachment to the frame rail. In a preferred embodiment, the frame 24 is provided with another frame rail on the opposite side of the engine and the engine includes a similar mount assembly on the opposite side so that the engine is supported by similar mount assemblies on both sides when installed in the frame rail.

Figure 2:
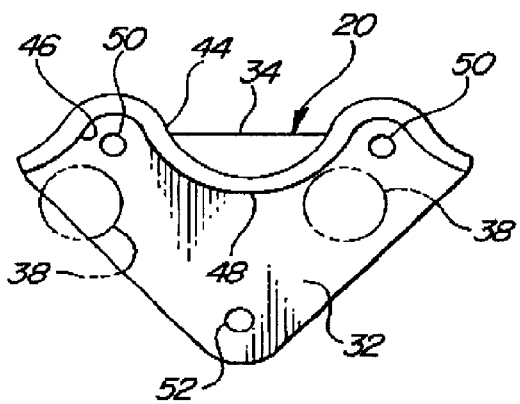
FIG. 2 is a face view of the frame bracket with the frame tubes shown to indicate the manner of longitudinal centering of the bracket.
Figure 3:
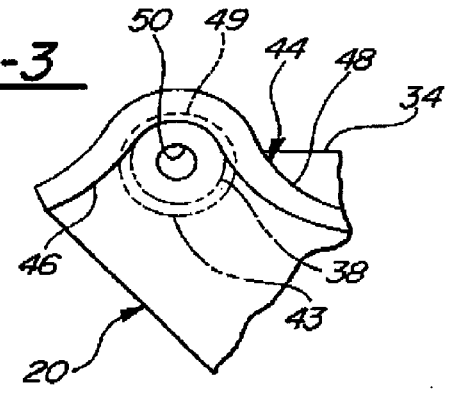
FIG. 3 is a view similar to FIG. 2 showing the assembled position of the bracket and tubes.

Assembly of the engine, mount and frame assembly of the invention is as follows. The bracket 16, isolator 18 and frame brackets 20, which may be supplied as an assembly, are mounted to the mounting pad 14 of the engine to provide the engine mount assembly on one side of the engine. A similar assembly is mounted on the other side, although it would be possible to utilize a different form of mount on the far side of the engine, if desired. The engine, with its mounting components, is then lowered into position from above so that the frame bracket 20 on each side, if used, comes to rest with the V recesses 46 of the lip 44 resting on the upper tubes 38 and the flanges 43 extending into the slots 49, as shown in FIG. 3. During the assembly process, the V recesses combine with the central bowed portion 48 to guide the frame bracket 20 into proper alignment with the tubes 38, 40, as indicated in FIG. 2. There it is shown that when the bracket 20 is longitudinally offset from the tubes, the tubes 38 engage the sides of the V recesses 46 and allow the bracket 20 to slide down into its proper position as shown in FIG. 3.

Figure 5:
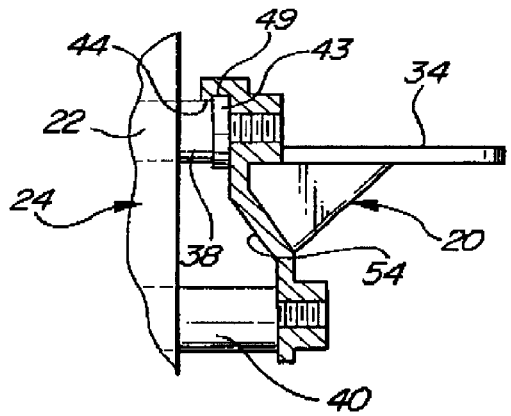
FIG. 5 is a view similar to FIG. 4 but showing the assembled position of the components.

Lateral alignment of the engine in the frame is provided as shown in FIGS. 4 and 5. The angled outer face or ramp 54 of the frame bracket 20 engages the upper tubes 38, if needed, and guides the bracket laterally into position so that tubes 38 are positioned in direct engagement with the bracket 20 when the tubes have been properly positioned within the V recesses 46. At this point, the further projecting lower tube 40 is also positioned in alignment and engagement with the lower opening and associated boss of the mounting portion 32 of frame bracket 20. Thus, the engine and mount assembly is guided both longitudinally and laterally into its proper position by interaction of the frame bracket 20 with the upper tubes 38 upon which the lip 44 of the bracket ultimately rests. The flanges 43 then engage the slots 49 and prevent the frame bracket from shifting laterally and slipping off the tubes 38 prior to installing the mounting bolts 42. The assembly is then completed by installing the mounting bolts 42 through the tubes 38, 40 and into engagement with the threaded openings 50, 52 in the bracket 20.

Since installation of the engine mount assembly in the frame may result in some lateral misalignment of the upper and lower studs of the isolator, the support 34 is provided with the laterally elongated opening 36 so that, if desired, a fastener nut, not shown, at the lower end of the isolator may be loosened and the isolator aligned by movement in the slot 36 prior to tightening of the isolator fastener and, if necessary, the frame bracket mounting bolts 42.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. An engine mount assembly for mounting an engine on a frame, said assembly comprising:
    an engine bracket including a first mount for mounting the engine bracket on a wall of the engine and having a first support extending laterally outwardly from the first mount;
    a frame bracket including a second mount for mounting the frame bracket on the frame and having a second support extending inwardly from the second mount;
    an engine mount isolator connected between the first and second supports for supporting the engine bracket from the frame bracket;
    the second mount including an outer face having at least one outwardly extending lip forming a pair of downwardly facing inverted V recesses adapted to engage longitudinally spaced protrusions on the frame to align and support the frame bracket on the frame; and
    fastener receiving openings through the second mount and adapted to receive fasteners connectable with the frame for securing the frame bracket in its aligned position on the frame; and
        wherein said fastener receiving openings include two longitudinally spaced upper openings associated one with each of said inverted V recesses and a third lower opening spaced below said upper openings and engagable for securing the second mount solidly to the frame.

2. An engine mount assembly as in claim 1 wherein slots are provided in the V recesses to receive flanges on said protrusions on the frame.

3. An engine mount assembly as in claim 1 wherein said lip is continuous, having a downwardly bowed portion between said V recesses for guiding said recesses into alignment with said spaced protrusions on the frame during mounting on the frame of an engine secured to said engine mount assembly.

4. An engine mount assembly as in claim 1 wherein said second mount includes an upwardly and outwardly inclined face between the upper and lower openings for guiding the engine and mount assembly into lateral alignment with the frame.

5. An engine mount assembly as in claim 1 wherein said first and second supports include mounting holes aligned in assembly to receive upper and lower mounting studs projecting from the mount isolator, one of said supports having its mounting hole laterally elongated to allow lateral adjustment of the isolator in the elongated hole after lateral alignment of the engine in the frame by the frame mounting bracket.

6. An engine, mount and frame assembly comprising:
    a frame having a frame rail and a pair of longitudinally spaced protrusions extending inward from the frame rail;
    an engine having a mounting wall; and
    an engine mount assembly mounting the engine mounting wall on the frame rail, said engine mount assembly including
        an engine bracket including a first mount mounted to said wall and having a first support extending laterally outwardly from the first mount;
        a frame bracket including a second mount mounted on the frame rail and having a second support extending inwardly from the second mount;

an engine mount isolator connected between the first and second supports and supporting the engine bracket from the frame bracket;

the second mount including an outer face having at least one outwardly extending lip forming a pair of downwardly facing inverted V recesses spaced longitudinally relative to the frame and engaging said longitudinally spaced protrusions on the frame rail to align and support the frame bracket on the frame rail;

fastener receiving openings in the second mount; and fasteners extending into said openings and engaging the frame rail to secure the frame bracket in its aligned position on the frame rail; and wherein said lip is continuous, having a downwardly bowed portion between said V recesses for guiding said recesses into alignment with said spaced protrusions on the frame during mounting of said engine and mount on the frame.

7. An engine, mount and frame assembly as in claim 6 wherein:

said fastener receiving openings include two longitudinally spaced upper openings centered one within each of said inverted V recesses and a third lower opening spaced below said upper openings; and said protrusions comprise tubes mounted to the frame rail and extending laterally inward thereof, the tubes having through openings aligned in assembly with said openings in the second mount;

said fasteners extending through the tubes into the aligned openings in the mount and securing the engine and mount in assembly to the frame.

8. An engine, mount and frame assembly as in claim 7, wherein upper ones of said tubes have inner ends including flanges engaging slots formed in said V recesses of the lip.

9. An engine, mount and frame assembly as in claim 7 wherein said tubes extend through the frame rail.

10. An engine, mount and frame assembly as in claim 9 wherein said second mount includes an upwardly and outwardly inclined face between the upper and lower openings of the second mount for guiding the engine and mount assembly into lateral alignment with the frame and said tubes include laterally spaced upper tubes and a downwardly spaced lower tube, the lower tube projecting further inward than the upper tubes to receive the inclined face of the second mount and provide lateral engagement of the tubes with the second mount upon assembly.

11. An engine, mount and frame assembly as in claim 10 wherein said first and second supports include mounting holes aligned in assembly to receive upper and lower mounting studs projecting from the mount isolator, one of said supports having its mounting hole laterally elongated to allow lateral adjustment of the isolator in the elongated hole after lateral alignment of the engine in the frame by the frame mounting bracket.

* * * * *